3,505,292
STABILIZATION OF OXYMETHYLENE
POLYMERS BY HYDROLYSIS
Eldred T. Smith, Corpus Christi, Tex., and Walter E. Heinz, Frankfurt am Main, Germany, assignors to Celanese Corporation, a corporation of Delaware
No Drawing. Continuation of application Ser. No. 400,586, Sept. 30, 1964. This application May 8, 1968, Ser. No. 727,746
Int. Cl. C08g 1/22, 1/28
U.S. Cl. 260—67                          3 Claims

ABSTRACT OF THE DISCLOSURE

Disclosed herein is a process for stabilizing oxymethylene copolymers. The basic process comprises hydrolyzing the unstable portions of the copolymers. In accordance with the instant invention the hydrolysis occurs in solution. The system is then cooled to a temperature sufficiently low to form two liquid phases but not so low as to precipitate out a solid material. The instant process facilitates separation and minimizes the need for filtration. This application is a continuation of Ser. No. 400,586 filed Sept. 30, 1964, now abandoned.

---

This invention relates to stabilized polymers and, more particularly, to polymers which are comparatively stable against degradation but which are derived from polymers which have a higher susceptibility to such degradation. The invention also relates to method of stabilizing such polymers.

Certain polymers are comprised of comparatively stable and comparatively unstable monomeric units and many times the resistance of such polymers to degradation depends upon the relative location of the aforementioned stable and unstable monomeric units. For example, if a polymer is susceptible to degradation by a mechanism which attacks the ends of the molecules, the polymer will have less stability than if the molecule ends are relatively stable to degradation.

While the subject invention will be described with reference to oxymethylene copolymers it should not be limited thereto as the principles of the invention applicable to other polymers having appropriate stable and unstable units.

In general, the invention involves the stabilization of a polymer having stable and unstable units in its molecules by treating the polymer in such a way as to selectively degrade the polymer and remove unstable units from its molecules and thereafter recovering the polymer.

A preferred embodiment of this invention relates to a method of stabilizing a copolymer against thermal degradation wherein the unstabilized polymer is susceptible to such degradation inasmuch as it contains monomeric units of comparatively high susceptibility to thermal degradation which are interspersed with other monomeric units which are comparatively stable to thermal degradation. The invention relates to subjecting the polymer to a treatment to degrade the end portions of the molecules of the polymer which are made up of the comparatively susceptible monomeric units thereby leaving a residual polymer having the comparatively stable monomeric units in terminal portions of its molecules. In one embodiment of this invention at least 50 and preferably at least 80% of the polymeric chains of the molecules of the treated polymer have comparatively stable, or comparatively thermal-resistant, units in terminal positions.

In a preferred embodiment of the invention involves accomplishing the terminal degradation of the polymer molecules by a hydrolysis reaction where the polymer is in solution. The solution is then cooled to form a liquid system having one phase with a comparatively high polymer content and a second liquid phase having a comparatively low polymer content. The phases are then separated and the polymer is recovered from the polymer-rich phase.

Oxymethylene polymers, having recurring —OCH$_2$- units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of our invention the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and will not induce undesirable reactions. In a preferred embodiment the polymers have a chain containing between about 85 and 99.6 mol percent of the oxymethylene units interspersed with between about 0.4 and about 15 mol percent of the —O—R units. The preferred copolymers are those containing oxymethylene and oxyethylene groups, such as copolymers of trioxane with dioxolane or with ethylene oxide. In a preferred embodiment R may be, for example, an alkylene or substituted alkylene group containing at least two carbon atoms.

Among the copolymers which may be utilized in accordance with this aspect of the invention are those having a structure comprising recurring units having the formula:

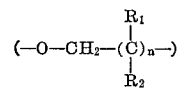

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

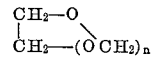

where $n$ is an integer from zero to 2.

Examples of preferred polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, which patent is assigned to the same assignee as the subject application.

Among the specific cyclic ethers which may be used are ethylene oxide; 1,3, dioxolane; 1,3,5-trioxepane; 1,3-dioxane; trimethylene oxide; pentamethylene oxide; 1,2-propylene oxide; 1,2-butylene oxide; neopentyl formal; paraldehyde; tetrahydrofuran and butadiene monoxide.

Other oxymethylene polymers and methods of preparation therefor are disclosed by Kern et al. in Angewandte Chemie 73(6) 177–186 (Mar. 21, 1961) including polymers containing repeating carbon-to-carbon single bonds in the polymer chain by copolymerizing trioxane with cyclic ethers such as dioxane, lactones such as beta-propiolactone, anhydrides such as cyclic adipic anhydride, and ethylenically unsaturated compounds such as styrene, vinyl acetate, vinyl methyl ketone, acrolein, etc. These and other polymers are disclosed by Sittig in "Polyacetals—What You Should Know." Petroleum Refiner 41(11), p. 131–170, November, 1962.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in the now abandoned U.S. patent application Ser. No. 229,715, filed Oct. 10, 1962 by W. E. Heinz and F. B. McAndrew, which is assigned to the same assignee as the subject application.

The preferred polymers which are treated in this invention are thermoplastic materials having a melting point of at least 150° C. and are normally millable at a temperature of 200° C. They have a number average molecular weight of at least 10,000. These polymers are suitable for making molded articles, films, sheets, fibers, pipes, etc.

These polymers have a high thermal stability before treatment in accordance with this invention but this stability is markedly improved by such treatment. For example, if a sample of the polymer which has been treated in accordance with this invention, and which has also been chemically stabilized as described below, is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of α-pinene). After treatment the preferred copolymers exhibit remarkable alkaline stability. For example, if the treated copolymers are refluxed at a temperature of about 142°–145° C. in a 50% solution of sodium hydroxide in water for a period of 45 minutes, the weight of the copolymer will be reduced by less than one percent.

Any of the known catalysts suitable for the polymerization of trioxane itself or with other materials may be used to make suitable copolymers.

Preferred catalysts are cationic catalysts including such inorganic fluorine-containing catalyst as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride and compounds containing these materials such as boron fluoride coordinate complexes with organic compounds, particularly those in which oxygen or sulfur is the donor atom.

Other suitable catalysts include thionyl chloride, fluorosulfonic acid, methane sulfone acid, phosphorus trichloride, titanium tetrachloride, ferric chloride, zirconium tetrachloride, aluminum trichloride, stannic chloride and stannous chloride.

The particularly preferred catalysts are boron fluoride and boron fluoride-containing materials such as boron fluoride monohydrate, boron fluoride dihydrate and boron fluoride trihydrate as well as the previously mentioned boron fluoride coordinate complexes with organic compounds.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,989,505; 2,989,506; 2,989,507; 2,989,508; 2,989,509; all of which are by Donald E. Hudgin and Frank M. Berardinelli; 2,989,510, by George J. Bruni; and 2,989,511 by Arthur W. Schnizer. All the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture such as may be present in the commercial grade reactants or may be introduced by contact with atmospheric air, will not prevent polymerization, but should be removed for best yields.

In preparing the preferred copolymers, the trioxane, cyclic ether and catalyst are dissolved in a common anhydrous solvent such as cyclohexane, and permitted to react in a reaction zone. The temperature in the reaction zone may vary from about 0° C. to about 120° C. The period of reaction may vary from about 5 minutes to about 72 hours. Pressures from subatmospheric to about 100 atmospheres, or more may be used, although atmospheric pressure is preferred.

The chemical constitution of the cyclic ether must be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol per cent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine or triethylamine, in a stoichiometric excess over the amount of free catalyst in a reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Patent No. 2,989,509 by Donald E. Hudgin and Frank M. Berardinelli, assigned to the same assignee as the subject application.

By the use of techniques which are conductive to the production of polymers of high molecular weight and by the incorporation of comonomers, as described above, it has been possible to produce polymers having oxymethylene groups directly attached to each other which are relatively stable against thermal degradation. By further incorporation of chemical stabilizers, as described below, it has been possible to stabilize oxymethylene polymers so that their degradation rate is less than about 0.1 weight percent per minute for most of the polymer mass when the polymer is maintained in an open vessel in a circulating air oven at 230° C. However, despite this high stability for most of the polymer mass, it has been difficult to reduce the initial degradation rate of the polymer (at 230° C. in air) to a satisfactory level. It has been found that a polymer may be reduced to a degradation rate (at 230° C. in air) for most of its mass of less than 0.1 weight percent per minute while the initial 0.5 to 20 weight percent of the polymer has a higher degradation rate (at 230° C. in air) of the order of between 1 and 0.5 weight percent per minute. For the purpose of convenience the degradation rate (at 230° C. in air) for most of the polymer mass is hereinafter designated as the "base" degradation rate.

During molding processes, oxymethylene polymers are generally heated to temperatures between about 180° and about 230° C. for relatively short periods between about 5 seconds and about 5 minutes. Even where the base degradation rate (at 230° C. in air) has been reduced to below 0.1 weight percent per minute, it has been found that molded products have uneven surface characteristics, due to gassing, unless the initial degradation rate is also reduced to below 0.1 weight percent per minute.

In accordance with one aspect of the invention, a polymer containing comparatively stable and comparatively unstable portions is subjected to treatment with a reactant to selectively degrade the polymer and remove unstable portions from its molecules while the polymer is in solution in a liquid hydrolysis medium.

After completion of the hydrolysis reaction the dissolved polymer solution is cooled. If the amounts of solvent, hydrolysis reactants and polymer are appropriate, upon cooling, the solution will separate into two liquid phases. One of these phases is found to have a comparatively high polymer content preferably having at least 80% of the polymer in the polymer-rich phase. In a preferred embodiment the polymer-rich phase contains over 90% of the polymer and in certain preferred embodiments will contain over 98% of the polymer. If the temperature is kept such that the two liquid phases are present these phases may be separated from each other. After separation the polymer is recovered from the polymer-rich phase by suitable methods. The polymer-poor phase may be recirculated to the hydrolysis solvent medium. If desirable, the polymer may be removed from the polymer-poor phase before such circulation, by filtration, for example.

While the solvent should contain water or hydroxy compounds they should not be present in amount great enough to cause the polymer to remain undissolved at the temperature of the hydrolysis reaction. Thus it can be seen that the temperature of the hydrolysis reaction is related to the amount of water which can be used. It is preferred that the solvent form only a single phase at the reaction temperature, although two phases may form when the solution is cooled to precipitate the polymer.

The organic hydroxy containing material may, for example, be an alcohol. Suitable alcohols include aliphatic alcohols and preferably those containing from 1 to 20 carbon atoms including methyl alcohol, ethyl alcohol, n-propyl alcohol, isopropyl alcohol, n-butyl alcohol, isobutyl alcohol, sec-butyl alcohol, tert-butyl alcohol, the amyl alcohols, the hexyl alcohols, octyl alcohols including capryl alcohol, decyl alcohol, lauryl alcohol, myristyl alcohol, cetyl alcohol, stearly alcohol, beta-methoxyethyl alcohol, etc. Other suitable alcohols include the aromatic alcohols, preferably those having 1 to 20 carbon atoms, including benzyl alcohol, alpha-phenylethyl alcohol, beta-phenylethyl alcohol, o-methylbenzyl alcohol, diphenylcarbinol, triphenylcarbinol, o-ethylbenzyl alcohol, p-propylbenzyl alcohol, 2-methylolbenzyl alcohol, 3-ethylolbenzyl alcohol, 3-methylol alpha-phenylethyl alcohol, etc.

Other suitable alcohols include cycloaliphatic alcohols, preferably those having from 1 to 20 carbon atoms including cyclopentyl carbonyl dicyclohexyl-1,1'-diol, 1,2-dimethylcyclopentane-1,2-diol, cyclopentyl alcohol, 1,2-dimethylcyclopentyl alcohol, 1, methylcyclohexyl alcohol, 3, methylcyclohexyl alcohol, 2, propylcyclopentyl alcohol, 2,2-dimethylcyclopentyl alcohol, cyclopentylethyl methylol, cyclohexylethyl methylol, etc.

Other suitable alcohols include the polyhydric alcohols, some of which have been mentioned above, preferably those containing from 1 to 20 carbon atoms, such as ethylene glycol, glycerol, diethylene glycol, pentamethylene glycol, propylene glycol, trimethylene glycol, 1,2-butanediol, 1,3-butanediol, 1,4-butanediol, hexamethylene glycol, trimethylolpropane, trimethylolethane, quercitol, inositol, 1,8-octanediol, 1,3,7-octanetriol, etc.

The organic materials containing a ketone oxygen atom preferably contain from 2 to about 20 carbon atoms and may include acetone, methylethyl ketone, methyl n-propyl ketone, methyl isopropyl ketone, diethyl ketone, hexanone-2, hexanone-3, acetylacetone, acetonylacetone, di-n-propyl ketone, etc.

Suitable ester oxygen containing materials preferably contain from 2 to about 20 carbon atoms and may include ethyl acetate, n-propyl acetate, isopropyl acetate, n-butyl acetate, sec-butyl acetate, tert-butyl acetate, isobutyl acetate, ethyl propionate, ethyl n-butyrate, methyl isobutyrate, n-propyl valearate, ethyl caproate, ethyl laurate, n-propyl palmitate, ethyl stearate, etc.

Suitable etheric oxygen containing materials preferably contain from 2 to about 20 carbon atoms and may include dimethyl ether, diethyl ether, di-n-propyl ether, diisopropyl ether, di-n-amyl ether, methylethyl ether, methyl n-propyl ether, methyl isopropyl ether, ethyl n-propyl ether, methylal, m-dioxane, p-dioxane, etc.

The temperature of the hydrolysis treatment must be above the solution temperature of the polymer in the solvent and is suitably between about 100° C. and about 250° C. At higher temperatures within this range the hydrolysis treatment is conducted under sufficient pressure to maintain the solution in liquid phase. The normally preferred temperature range is between about 150 and 180° C.

The terminal units of the oxymethylene polymer are often hydroxy-substituted oxymethylene (—O—CH$_2$—OH)

units and detachment of an oxymethylene group from the polymer molecule by the hydrolysis reaction has the effect of shifting the hydrogen atoms of the hydroxyl group to the oxygen atom of the next adjacent oxymethylene group.

When oxyethylene units, for example, are incorporated in the polymer chain by copolymerization as described above, the successive detachment of oxymethylene units takes place until an oxyethylene unit becomes the terminal unit of the chain. The oxyethylene units, having carbon-to-carbon bonds therein, are comparatively resistant to such detachment, and remain attached to the polymeric chain in the terminal position and protect the internal oxymethylene units from further hydrolytic removal. Since oxyethylene units are also resistant to detachment by heat, the degraded molecule has a better initial thermal stability than the original copolymer from which it was derived.

During the hydrolysis reaction a portion of the copolymer is decomposed to formaldehyde resulting in a weight loss of copolymer. It is believed that the formaldehyde is formed by the successive detachment of the terminal oxymethylene units from the ends of the polymer chain. The hydrolytic degradation of unstable groups is complete when the weight loss substantially ceases.

It has been found that the products of the selective hydrolysis treatment, after substantially constant weight is achieved, are also extremely stable against attack at the reaction conditions. The treatment produces a weight loss at a first, comparatively high, rate, which, after the treatment continues for a suitable period of time, drops to a rate of less than 20% of the first rate loss, and, most preferably, between 0.1% and 5% of the first rate loss. Thus, in a preferred embodiment, the polymer is subjected to the reaction conditions until it achieves substantially constant weight. Thus, an oxymethylene copolymer, having had the hydrolytic treatment, is not only thermally stable but is also extremely stable against such further hydrolytic treatment even at conditions more severe than those of the treatment. This is true despite the fact that the polymer still has a substantial content of internal oxymethylene units which are normally subject to degradation by alkaline hydrolysis unless protected by suitable end groups which are resistant to degradation under such conditions.

In a preferred embodiment the dissolved polymer is subjected to the hydrolysis under non-acidic, preferably alkaline, conditions where the pH is at least 7. The alkaline material is preferably water soluble, or soluble in the organic solvent material, and may be a strongly basic hydroxide such as the hydroxide of an alkali metal, or alkaline earth metal, or it may be the salt of a strong base and weak acid, or it may be ammonia or an organic base, such as an amine or an amidine.

Suitable alkaline materials include ammonium hydroxide, sodium hydroxide, potassium hydroxide, sodium carbonate, sodium acetate, hexamine, triethanolamine, tripropylamine, trimethylguanidine, trimethylamine, tributylamine, etc.

In a preferred embodiment the amount of alkaline material present in the chemical reaction is from 0.001 weight percent to about 10.0 weight percent, most preferably between about 0.001 weight percent and about 1.0 weight percent. When no alkaline material is used it may be desirable to have the reaction take place in a buffered system since some of the products of the hydrolysis are acidic and would thereupon cause the system to become acidic which might have deleterious effects on the polymer.

In addition alkaline hydrolysis is preferable over neutral hydrolysis since it is faster and since the alkaline material will neutralize any excess polymerization catalyst which might otherwise tend to degrade the polymer during the hydrolysis step.

The solvent medium is suitably used in amounts between about 1 and about 50 pounds per pound of copolymer and preferably between about 3 and about 20 pounds per pound of copolymer.

The hydrolysis reaction may take from about 15 seconds to about 1 hour with from about 1 to 2 minutes being preferred.

In general, the hydrolysis reaction should continue and should selectively remove the comparatively thermally unstable terminal units until at least one of the following events occurs.

(1) The weight loss rate of the treated polymer is below 0.1 weight percent per minute.

(2) At least 95% of the polymer molecules which were terminated by the comparatively thermally unstable terminal units, are terminated by camparatively stable units having carbon-to-carbon bods derived from the

—O—R— units.

(3) A disc of the treated polymer having a thickness of 50 mils will lose no more than about 1% of its weight in a ½ hour when subjected to 50 weight percent sodium hydroxite at 45° C.

(4) The weight loss rate drops to between about 0.1 and about 5% of the first initial weight loss rate. The above weight loss rates are stated in terms of weight lost per minute when the polymer is maintained in an open vessel in a circulating air oven at 230° C.

The hydrolysis process is further described in U.S. patent application Ser. No. 102,096, filed Apr. 11, 1961 now U.S. Patent No. 3,174,948, granted Mar. 23, 1965 to Wall, Smith and Fisher, in U.S. patent application Ser. No. 372,390, filed June 3, 1964, now U.S. Patent No. 3,219,623 granted Nov. 23, 1965 to Berardinelli and in U.S. Patent application, Ser. No. 400,585 filed Sept. 30, 1964, now U.S. Patent No. 3,428,605 granted Feb. 18, 1969 to Smith and Heinz. Those patents are assigned to the same assignee as the subject application.

In a preferred embodiment it is generally desirable to incorporate one or more thermal stabilizers into the copolymer in order to bring its thermal degradation even lower. The proportion of stabilizer incorporated depends upon the specific stabilizer used. A proportion between about 0.05 and 10 weight per cent (based on the weight of polymer) has been found to be suitable for most stabilizers.

One suitable stabilizer system is a combination of (1) an antioxidant ingredient, such as phenolic antioxidant and most suitable a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having 1 to 4 carbon atoms. The preferred alkylene bisphenols are 2,2'-methylene bis-(4-methyl-6-tertiary butyl phenol) and 4,4' - butylidene bis - (6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, subsituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. Other suitable stabilizers are described in the above mentioned Kern et al. and Sittig articles and in the references cited therein.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

In one advantageous method of operation, the polymerization product may be quenched with a quenching medium which is also suitable as a hydrolysis medium. For example, a polymerization product removed from a polymerization zone at a temperature between about 60° and about 116° C. may be quenched with from about 1 to 30 times (preferably form about 4 to about 20 times) its weight of solvent medium, based on the weight of the mixture. The mixture of polymerization product and quench medium is wet ground to break up the larger particles of polymer and the slurry (having from about 2 to about 20 wt. percent of solids) is suitable for hydrolysis. From about 10 to about 1000 p.p.m. of ammonia (based on the weight of solid polymer) is added and the slurry is heated to a temperature at which the polymer dissolves.

In the following tables there are set forth data relating to temperatures at which two liquid phases will form and temperatures at which solid polymers will precipitate when cooled from solution. The materials involved are an oxymethylene copolymer prepared from trioxane and 2% ethylene oxide using a boron trifluoride polymerization catalyst as disclosed in U.S. Patent No. 3,027,352. The polymer was dissolved in the U.S. Patent No. 3,027,-352. The polymer was dissolved in the various mixtures indicated and was cooled to determine the temperature at which two liquid phases formed. The two-phase solution was then further cooled to determine the temperature at which precipitation of the copolymer takes place. Of course, the temperautres at which the two phases form and the temperatures at which the solids precipitate depend on which solvents are used, pressures, the percentages of polymer, solvents, etc., present, etc. If desired, phase diagrams may be readily made from Tables I, II and III and from data obtained from investigation of the other materials which may be present in the hydrolysis solvent medium as indicated previously.

TABLE I.—AQUEOUS TRIOXANE-OXYMETHYLENE COPOLYMER SYSTEM

| Sample No. | Composition of mixture | | | | Trioxane-ratio by wt. | Phasing temp. range, °C.[1] | Solid polymer precipitation temp. range, °C.[2] |
| --- | --- | --- | --- | --- | --- | --- | --- |
| | Oxymethylene copolymer, wt. percent | Trioxane, wt. percent | H$_2$O wt. percent | NH$_3$ wt. percent | | | |
| 1 | 19.9 | 56.1 | 23.2 | 0.8 | 2.4 | 110.5–110.5 | 108.0–107.5 |
| 2 | 30.0 | 49.0 | 20.3 | 0.7 | 2.4 | 119.0–120.5 | 113.5–111.5 |
| 3 | 40.2 | 41.9 | 17.3 | 0.6 | 2.4 | 114.0–115.0 | 112.0–112.0 |
| 4 | 49.3 | 35.5 | 14.7 | 0.5 | 2.4 | 117 | 115.0–114.5 |
| 5 | 4.1 | 57.0 | 37.9 | 1.0 | 1.5 | 130.5–130.0 | 109.5–110.5 |
| 6 | 10.6 | 53.2 | 35.3 | 0.9 | 1.5 | 137.0–136.0 | 112.0–112.5 |
| 7 | 19.8 | 47.7 | 31.7 | 0.8 | 1.5 | 148.0–149.0 | 114.0–115.0 |
| 8 | 30.2 | 41.5 | 27.6 | 0.7 | 1.5 | 150.0–144.5 | 114.5–115.0 |
| 9 | 39.9 | 35.8 | 23.7 | 0.6 | 1.5 | 159.0–150.0 | 117.0–117.5 |
| 10 | 50.2 | 29.6 | 19.7 | 0.5 | 1.5 | 150.0–148.0 | 118.0–119.5 |
| 11 | 5.2 | 47.4 | 46.4 | 1.0 | 1.0 | 164.0–163.5 | 113.0–115.0 |
| 12 | 10.1 | 44.9 | 44.1 | 0.9 | 1.0 | 165.5–165.5 | 115.0–116.0 |
| 13 | 19.5 | 40.3 | 39.4 | 0.8 | 1.0 | 175.0–174.5 | 118.0–119.0 |
| 14 | 29.6 | 35.2 | 34.5 | 0.7 | 1.0 | 177.0–178.0 | 118.0–119.0 |
| 15 | 39.6 | 30.2 | 29.6 | 0.6 | 1.0 | 187.0–183.0 | 120.0–121.0 |

[1] This is the temperature at which the homogeneous solution separates into two liquid phases. A range is given to indicate the spread in temperature observed upon repeated heating and cooling of the same solvents polymer mixture.
[2] This is the temperature at which solids began to precipitate from the two-phase or homogeneous mixture. A range is given to indicate the spread in temperature observed upon heating and cooling of the same solvent-polymer mixture.

TABLE II.—OXYMETHYLENE COPOLYMER-WATER-METHANOL SYSTEM

| Sample No. | Composition of mixture | | | | Methanol-water ratio by weight | Phasing temp. range °C. ([1]) | Solid polymer precipitation temp. range °C. ([2]) |
| --- | --- | --- | --- | --- | --- | --- | --- |
| | Oxymethylene copolymer, wt. percent | Water, wt. percent | Methanol, wt. percent | Ammonia, wt. percent | | | |
| 1 | 1.8 | 38.9 | 58.4 | 1.0 | 1.5 | 138–137.5 | 123 |
| 2 | 7.3 | 36.7 | 55.1 | 0.9 | 1.5 | 138 | 124.5–124 |
| 3 | 8.0 | 36.4 | 54.7 | 0.9 | 1.5 | 137.5–137 | 125.5 |
| 4 | 17.5 | 32.7 | 49.0 | 0.8 | 1.5 | 137–136.5 | 125 |
| 5 | 19.6 | 31.8 | 47.8 | 0.8 | 1.5 | 136.5–135 | 124.5 |
| 6 | 20.2 | 31.6 | 47.4 | 0.8 | 1.5 | 138–137.5 | 126–125 |
| 7 | 22.5 | 30.7 | 46.0 | 0.8 | 1.5 | 136–135 | 124.5 |
| 8 | 23.2 | 30.4 | 45.6 | 0.8 | 1.5 | 136.5–136 | 124 |
| 9 | 27.2 | 28.8 | 43.2 | 0.7 | 1.5 | 135 | 124.5–123 |
| 10 | 27.7 | 28.6 | 42.9 | 0.7 | 1.5 | 135.5–135 | 124 |
| 11 | 32.3 | 26.8 | 40.2 | 0.7 | 1.5 | 135.5–134 | 123–122.5 |
| 12 | 40.0 | 23.8 | 35.6 | 0.6 | 1.5 | 125–124.5 | 123 |
| 13 | 46.3 | 21.3 | 31.9 | 0.5 | 1.5 | 123.5–123 | 123–120 |
| 14 | 46.9 | 21.0 | 31.6 | 0.5 | 1.5 | 126–127 | 125–123 |
| 15 | 1.8 | 58.3 | 38.9 | 0.9 | 0.67 | 154 | 123.5 |
| 16 | 7.6 | 54.9 | 36.6 | 0.9 | 0.67 | 155–154 | 125–124.5 |
| 17 | 12.3 | 52.1 | 34.7 | 0.9 | 0.67 | 153.5–153 | 124 |
| 18 | 19.0 | 48.1 | 32.1 | 0.8 | 0.67 | 156.5 | 126.5 |
| 19 | 22.7 | 45.9 | 30.6 | 0.8 | 0.67 | 153.5 | 124 |
| 20 | 32.2 | 40.3 | 26.8 | 0.7 | 0.67 | 153 | 124 |
| 21 | 35.4 | 38.4 | 25.6 | 0.6 | 0.67 | 152–150 | 127 |
| 22 | 36.9 | 37.5 | 25.0 | 0.6 | 0.67 | 152.5–152 | 124–123.5 |
| 23 | 49.9 | 29.8 | 19.8 | 0.5 | 0.67 | 142–140 | 125.5 |
| 24 | 2.3 | 19.3 | 77.4 | 1.0 | 4.0 | 152.5 | 122.5 |
| 25 | 13.6 | 17.1 | 68.5 | 0.9 | 4.0 | 147 | 122.5 |
| 26 | 31.1 | 13.6 | 54.6 | 0.7 | 4.0 | 138–136.5 | 124–122.5 |
| 27 | 34.6 | 12.9 | 51.8 | 0.7 | 4.0 | 134.5–133 | 123–122 |
| 28 | 40.0 | 11.9 | 47.6 | 0.6 | 4.0 | 133–130 | 123 |
| 29 | 46.1 | 10.7 | 42.7 | 0.5 | 4.0 | 128–127 | 125–124 |
| 30 | 2.4 | 67.6 | 29.0 | 1.0 | 0.43 | 185–184 | 127 |
| 31 | 5.8 | 65.3 | 28.0 | 0.9 | 0.43 | 186–184 | 128 |
| 32 | 13.1 | 60.2 | 25.8 | 0.9 | 0.43 | 184–183 | 129.5–128 |
| 33 | 19.8 | 55.6 | 23.8 | 0.8 | 0.43 | 182.5–181.5 | 129–128.5 |

[1] This is the temperature at which the homogeneous solution separates into two liquid phases. A range is given to indicate the spread in temperature observed upon repeated heating and cooling of the same solvent-polymer mixture.
[2] This is the temperature at which solids began to precipitate from the two-phase or homogeneous mixture. A range is given to indicate the spread in temperature observed upon repeated heating and cooling of the same solvent-polymer mixture.

TABLE III.—OXYMETHYLENE COPOLYMER-WATER-ISOPROPYL ALCOHOL SYSTEM [1]

| Sample No. | Water to alcohol, wt. ratio | Oxymethylene Polymer conc., wt. percent | Phasing Temp., °C.[2] | Solid precipitation tem. Range, °C.[3] |
|---|---|---|---|---|
| 1 | 0.25 | 3.2 | 124.5-124 | 121-119 |
| 2 | 0.25 | 10.5 | 121.5-121 | 120-118.5 |
| 3 | 1.50 | 2.85 | 122.5-122.5 | 122-121.5 |
| 4 | 1.50 | 10.1 | 126.5-126.5 | 122.5-122 |
| 5 | 1.50 | 20.4 | 134.5-134 | 122 |
| 6 | 1.50 | 30.2 | 143.5-142.5 | 124.5-123.5 |
| 7 | 1.50 | 39.9 | 144-143.5 | 123 |
| 8 | 1.50 | 50.1 | 143-142.5 | 123.5 |
| 9 | 1.50 | 60.0 | 136-139 | 125 |
| 10 | 1.86 | 5.1 | 144-144.5 | 122.5 |
| 11 | 1.86 | 11.4 | 149-150 | 123.5 |
| 12 | 1.86 | 20.02 | 157-158 | 124.5 |
| 13 | 1.86 | 29.6 | 168-169 | 125.0 |
| 14 | 1.86 | 40.5 | 167.5-168 | 125.0 |
| 15 | 1.86 | 49.9 | 163-163.5 | 125.0 |
| 16 | 1.86 | 60.0 | 156-5-158 | 126.5 |
| 17 | 2.33 | 5.4 | 176.5-175.5 | 124-123.5 |
| 18 | 2.33 | 10.1 | 180.5-179.5 | 124.5-124 |
| 19 | 2.33 | 29.8 | 185-182 | 125-124 |
| 20 | 2.33 | 40.2 | 184-181 | 125 |
| 21 | 2.33 | 50.2 | 178 | 126 |
| 22 | 2.33 | 79.1 | 153-149 | 133-130 |

[1] Includes 1.0 weight % ammonia.
[2] This is the temperature at which the homogeneous solution separates into two liquid phases. A range is given to indicate the spread in temperature observed upon repeated heating and cooling of the same solvent-polymer mixture.
[3] This is the temperature at which solids began to precipitate from the two-phase or homogeneous mixture. A range is given to indicate the spread in temperature observed upon repeated heating and cooling of the same solvent-polymer mixture.

The temperature of phase formation may be easily determined by adding the desired concentration of polymer and alkaline material, if used, to the desired solvent in a container such as a glass ampule, sealing the container, heating the mixture with agitation until a homogeneous solution is obtained, and slowly cooling the mixture until the solution changes into two liquid phases, which may normally be indicated by the clear solution becoming cloudy and turbid.

The temperature at which the polymer-rich phase is separated from the other liquid phase should be such that vairations in temperature during removal will not cause dissolution of the two phases into a one phase solution or precipitation of the polymer. Preferably the temperature of the phase separation should be moderately close to that of the polymer precipitation temperature and in preferred embodiments a 5 to 7° C. differential above the polymer precipitation temperatures is adequate.

The polymer may be removed from the polymer-rich phase by spray drying, evaporation, filtration, etc. techniques. It may be desirable, in some instances, to wet spin or extrude the polymer-rich phase into a suitable non-solvent such as water to precipitate the polymer.

EXAMPLE I

A copolymer of trioxane and ethylene oxide is prepared from a monomeric mixture containing 2% of ethylene oxide using a boron trifluoride polymerization catalyst, as disclosed in U.S. Patent No. 3,027,352. The copolymer is ground and contacted at room temperature with a quenching and hydrolysis liquid consisting of 59.5 wt. percent methanol, 40 wt. percent water and 0.5 wt. percent ammonia. The resulting slurry, containing 8 wt. percent polymer, is heated with agitation to a temperature of 160° C. and, after 2 minutes at that temperature, during which time hydrolysis occurs, is cooled down to a temperature of below 137° C. where separation into a polymer-rich liquid phase and a liquid phase containing less than 2% polymer occurs. At a temperature of about 134° C. the polymer-rich phase is separated from the other liquid phase by mechanical decantation and the solvent is removed from the polymer-rich phase by evaporation to yield a dry polymer having a thermal degradation of 0.20% at 230° C.

EXAMPLE II

The procedure of Example I was repeated, except that the solvent consisted of equal parts by weight of trioxane and water and about 1 wt. percent of ammonia, the slurry contained about 10 wt. percent of polymer and was heated to a temperature of 180–185° C. for a period of 2.5 minutes to effect the hydrolysis reaction. The solution was cooled to below 165° C. to effect phase formation and the polymer-rich phase was separated at a temperature of 150° C. A dry polymer having a thermal degradation rate of 0.018% at 230° C. was obtained.

In addition to oxymethylene copolymers containing unstable end portions and stable portions as part of the same molecule, e.g. as is the case with copolymers of trioxane and cyclic ethers containing adjacent carbon atoms, the process of this invention is also suitable for the treatment of polymers made up of a mixture of stable and unstable whole molecules, e.g., such as occurs when an oxymethylene homopolymer mass is treated to "cap" only a portion of the ends of the molecules with such stable groups as ether groups, e.g., methoxy groups. In this case, the mass of polymer is made up of stable molecules having both ends capped with such stable groups, and unstable molecules with at least one end remaining uncapped with a comparatively unstable end group such as an acetate and group. The treatment will thus result in the complete degradation of the unstable molecules leaving a residue of stable molecule which may be cooled to the two phase liquid system as indicated previously.

It is to be understood that the foregoing detailed description is given merely by way of illustration and that many variations may be made therein without departing from the spirit of our invention.

The embodiments of the invention in which an exclusive property or privilege is claimed are described as follows:

1. In an improved process for the stabilization of a normally solid oxymethylene copolymer having a melting point above about 150° C., the molecules of said copolymer containing from about 85 to 99.9 mol percent of comparatively unstable monomeric oxymethylene units interspersed with comparatively stable monomeric —OR— units, wherein R is a divalent radical containing at least two carbon atoms directly linked to each other and positioned in the polymer chain between the two valences with any substituents on said R radical being inert and at least part of the terminal portions of said molecules comprising said unstable monomeric units, which process comprises selectively removing said comparatively unstable terminal units in the presence of a hydrolysis solvent medium wherein the hydrolysis reaction occurs while said polymer is in solution in said hydrolysis solvent medium, the improvement which comprises:
   (1) cooling the hydrolyzed polymer solution to a temperature which is above the solid precipitation temperature, to prevent the formation of a solid precipitate, but which is sufficiently low to permit the formation of a liquid system having a first liquid phase having a comparatively high polymer content containing at least about 80% of said polymer and having a second liquid phase having a comparatively low polymer content, and
   (2) separating said liquid phases and recovering solid hydrolyzed polymer from said comparatively high polymer content phase.

2. The process of claim 1 wherein said stable units are oxyethylene units.

3. The process of claim 1 wherein said comparatively high polymer content phase contains at least about 90% of said hydrolyzed polymer.

No references cited.

WILLIAM H. SHORT, Primary Examiner

L. M. PHYNES, Assistant Examiner